US012617113B2

(12) United States Patent
Dunn

(10) Patent No.: US 12,617,113 B2
(45) Date of Patent: May 5, 2026

(54) KNIFE HOLDER FOR CUTTING MACHINES

(71) Applicant: Dienes Werke fur Maschinenteile GmbH & Co. KG, Overath (DE)

(72) Inventor: Hans Dunn, Overath (DE)

(73) Assignee: Dienes Werke fur Maschinenteile GmbH & Co. KG, Overath (DE)

( * ) Notice: Subject to any disclaimer, the term of this patent is extended or adjusted under 35 U.S.C. 154(b) by 197 days.

(21) Appl. No.: 18/295,886

(22) Filed: Apr. 5, 2023

(65) Prior Publication Data

US 2023/0311356 A1 Oct. 5, 2023

(30) Foreign Application Priority Data

Apr. 5, 2022 (EP) .................................... 22166663

(51) Int. Cl.
*B26D 5/04* (2006.01)
*B26D 1/157* (2006.01)

(52) U.S. Cl.
CPC ............... *B26D 5/04* (2013.01); *B26D 1/157* (2013.01)

(58) Field of Classification Search
CPC .... B26D 7/2635; B26D 7/2621; B26D 1/157; B26D 5/04; B26D 2210/00
USPC ........................................................... 83/532
See application file for complete search history.

(56) References Cited

U.S. PATENT DOCUMENTS

2003/0188611 A1* 10/2003 Solberg ................ B26D 7/2621 83/482

FOREIGN PATENT DOCUMENTS

| | | | | | |
|---|---|---|---|---|---|
| CA | 2626530 | A1 * | 9/2008 | ............... B26D 5/04 |
| CN | 109109071 | A * | 1/2019 | ........... B23D 35/004 |
| DE | 19806444 | C1 * | 7/1999 | .............. B26D 1/14 |
| DE | 10260031 | B3 | 8/2004 | |

OTHER PUBLICATIONS

CN-109109071-A (Year: 2025).*
DE_19806444, Translation (Year: 2025).*

* cited by examiner

*Primary Examiner* — Nhat Chieu Q Do
(74) *Attorney, Agent, or Firm* — CALFEE, HALTER & GRISWOLD LLP

(57) ABSTRACT

A knife holder for cutting machines, with a cutter head (1) for holding a knife (2) and a positioning device (3), wherein the positioning device (3) can be driven in a drive direction (4) between a standby position and a cutting position, and comprises a spring (5), with which the positioning device (3) is applied against the drive direction (4), wherein the spring (5) generates a reset force having a negative force characteristic curve in the drive direction (4).

12 Claims, 4 Drawing Sheets

KNIFE HOLDER FOR CUTTING MACHINES

RELATED APPLICATION

Figure 1:
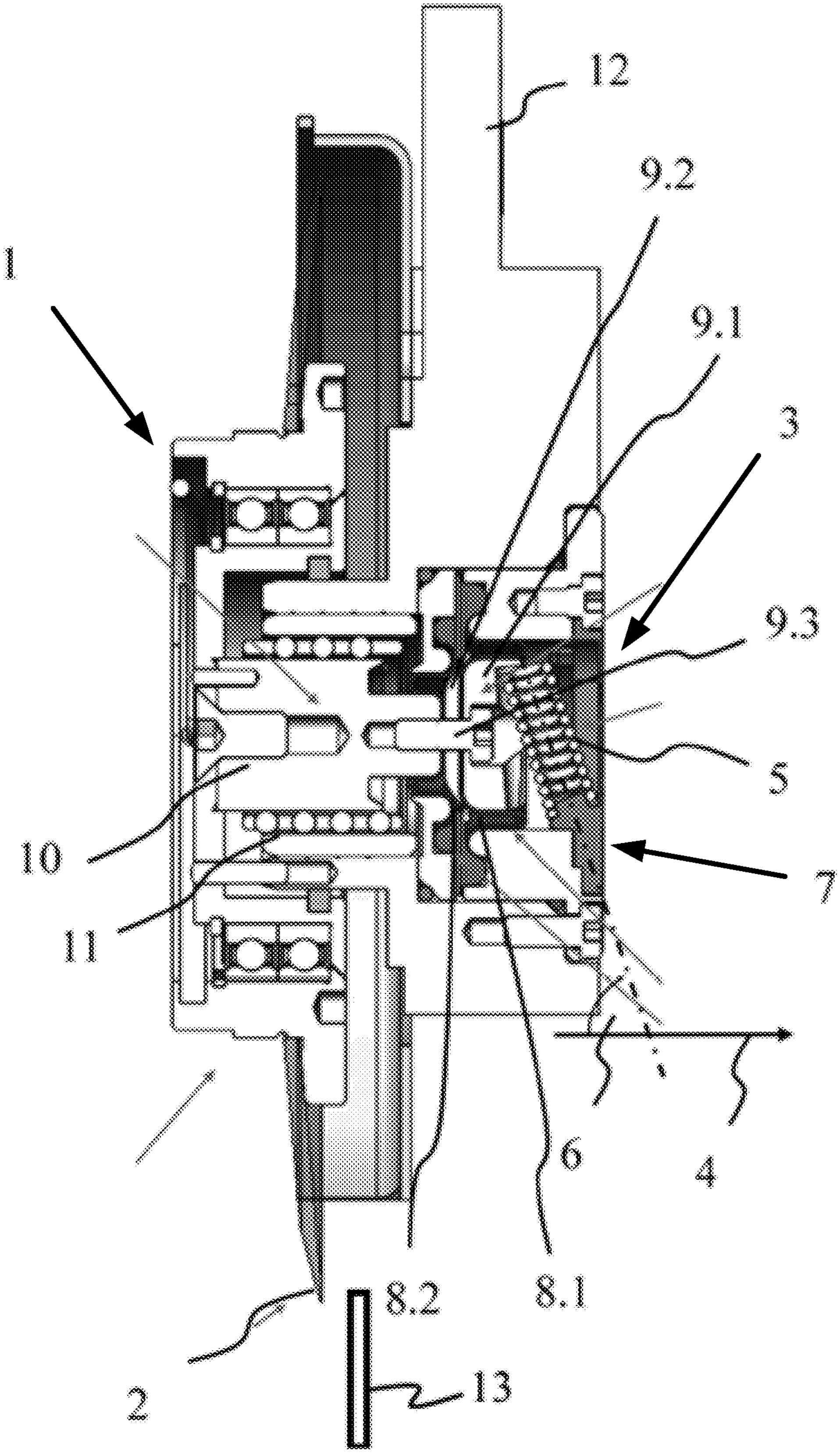

This application claims priority to EP patent application No. 22166663.9, filed on Apr. 5, 2022. The entirety of this application is incorporated herein by reference.

SPECIFICATION

The present invention relates to a knife holder for cutting machines, with a cutter head for holding a knife, in particular for holding a circular knife, and a positioning device for the cutter head, wherein the positioning device can be driven in a drive direction between a standby position and a cutting position in particular by means of a pneumatic drive, and comprises a spring, with which the positioning device is applied against the drive direction.

Usually, the spring preloads the positioning device, and hence the knife, in the standby position, while the positioning device, and hence the knife, can be transferred from the standby position into the cutting position along a straight line in the drive direction by a pneumatic drive. Such a knife holder is known from DE 102 60 031 B3. Also known from this publication is that the positioning force acting in the drive direction by way of the pneumatic drive diminishes as the delivery path increases. The spring acting exclusively against the drive direction according to DE 102 60 031 B3 further strengthens this effect, since the reset force generated by the spring grows as the delivery path increases. Therefore, depending on how large the positioning path from the standby position into the cutting position is, various cutting forces can be present when applying the knife against a lower knife. In order to overcome this disadvantage, DE 102 60 031 B3 proposes that a piston surface of a positioning piston have a cross section which varies in different piston positions. In such a design, there is also a high space requirement in the drive direction.

Therefore, the object of the present invention is to indicate an alternative for how the cutting force can be held as constant as possible along the drive direction.

The knife holder with the features in claim 1 indicates one way of achieving this object. Additional solutions and advantageous further developments of the knife holder are explained in the dependent claims and in the description above and below, wherein individual features of the advantageous further developments can be combined with each other in a technically reasonable way.

In particular, the object is achieved by a knife holder with the features mentioned at the outset, wherein the spring forms a negative force characteristic curve in the drive direction.

In other words: The basic idea of the invention provides that the spring be arranged and/or designed in such a way that the (reset) force that is generated by it and acts against the drive direction diminishes with an increasing travel distance. As a result, the (delivery) force that is in particular generated by a pneumatic drive and diminishes with an increasing travel distance is compensated by the spring in such a way that a cutting force generated when the knife contacts a counter knife is nearly constant at least over large distances along the drive direction. Therefore, the cutting force is identical regardless of the distance between the standby position and the cutting position. In particular, the spring is arranged and/or designed in such a way that a progression of the negative force characteristic curve corresponds to the progression of a force characteristic curve generated by an in particular pneumatic drive of the positioning device in the drive direction.

The invention also makes it possible to reduce the width of a knife holder (i.e., in the drive direction), as a result of which the adjustment range could in turn be increased given the same width.

Therefore, the arrangement (in particular a degree of inclination) and design of the spring (in particular the spring constant) are selected in particular so that the force characteristic curve diminishes in the drive direction to the same extent as the characteristic curve of the force exerted by the (pneumatic) drive of the positioning device, which in particular has a membrane.

In particular, the knife holder has an attachment device, for example with which the knife holder can be fastened to a traverse of a cutting machine.

The knife holder can comprise a lowering device, with which the cutter head can be moved in particular toward and away from a lower knife in a lowering device.

If the knife holder comprises a lowering device, the straight drive direction of the positioning device is orthogonally aligned to the lowering device. The positioning device can be used to set the knife in its axial direction on a cutting edge of a lower knife along a straight line.

Therefore, the invention preferably relates to the kind of positioning device with which a circular knife can be fed to a cutting edge of a lower knife in an axial direction of the circular knife.

In particular, the invention also relates to a cutting machine with a traverse, to which at least one, preferably several, knife holders according to the invention is/are fastened.

A preferred embodiment additionally provides that the springs also act with a force component inclined, and in particular orthogonal, to the straight drive direction. In this embodiment, the spring thus does not act exclusively parallel opposite the drive direction during a driven positioning process, but rather generates a force component both opposite the drive direction and inclined to the drive direction. Such a force component inclined (orthogonal) to the drive direction can partially compensate for a torque acting on the cutter head, which is generated by virtue of the knife being pressed against a lower knife in the cutting position. As a result, it is especially preferred that the spring be arranged and designed so as to counteract a torque, which is generated in the cutting position by pressing the circular knife against a counter knife in the drive direction. The friction during the cutting process is diminished by compensating for this torque, which is also referred to as the tilting moment.

In particular, the spring is a helical spring. Such a helical spring has a spring wire, which is coiled/wound into a screw shape.

The coiled spring wire defines a screw axis. The latter is preferably straight through the axis defined by the wound spring wire. However, it can also be provided that the axis be bent. In this case, reference is made to bow springs.

During the use of a helical spring, the in particular straight screw axis is aligned at an inclination to the drive direction. In this case, a force applied to the spring by the positioning device thus acts transversely to the screw axis of the spring. In particular, the reset force exerted by the helical spring parallel opposite the drive direction has a negative force characteristic curve. Therefore, the helical spring is aligned in such a way that a force generated by the drive of the positioning device, which diminishes as the travel distance increases, is compensated by a reset force that becomes smaller with an increasing travel distance. In addition, a torque generated by pressing the circular knife against a lower knife is compensated for by a force acting in the screw axis via the helical spring.

In a preferred embodiment, a longitudinal axis of the (helical) spring is aligned at an angle of 30° to 80°, preferably of 45° to 75°, especially preferably of 60° to 70° relative to the drive direction in the standby position.

In particular, the positioning device comprises a preferably pneumatic drive, so as to drive the knife in a drive direction between the standby position and the cutting position. In particular, the positioning device is set up in such a way as to drive the knife from the standby position into the cutting position proceeding from the drive, while the spring is arranged in the standby position for repositioning purposes.

One embodiment provides that the positioning device have a positioning piston apparatus that can be pressurized in particular by means of compressed air, wherein the spring acts on the positioning piston apparatus on the [side] facing away from the pressurizable side.

In this conjunction, it is provided in particular that the positioning piston apparatus comprise at least one, preferably two membrane(s). A pressurized fluid, in particular compressed air, can be introduced in particular between the two membranes. The use of two membranes makes it easy to provide an airtightly sealed space for feeding in compressed air.

The two membranes have different sized active surfaces so that the positioning device can be driven by feeding in compressed air. While feeding compressed air between the membranes, the positioning device is thus displaced in the direction of the membrane with the larger active surface.

In particular, this embodiment can provide that the positioning piston apparatus have a multipart positioning piston head, and that at least one membrane, preferably both membranes, be fixed in place by the parts of the positioning piston head. This enables an easy assembly of the positioning piston apparatus.

In an embodiment, the positioning piston apparatus has a positioning piston rod designed as an axis, wherein the axis is at least axially movably mounted by means of a bearing, so that the axis can be moved by the drive of the positioning device in an axial direction between the standby position and the cutting position. A receptacle for a circular knife is coupled with the axis, wherein the receptacle is mounted rotatably to the axis.

Figure 2:
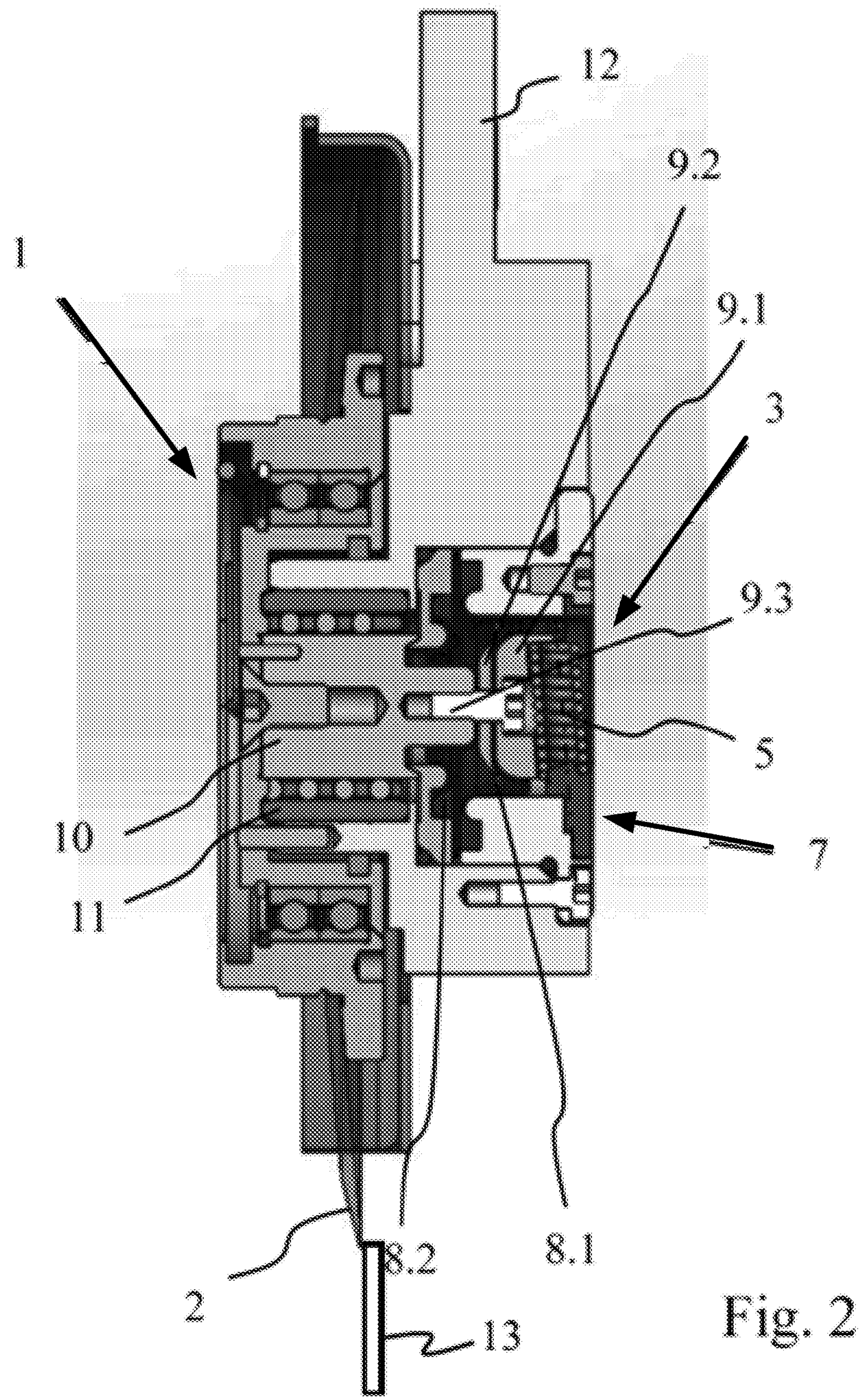
Figure 3A:
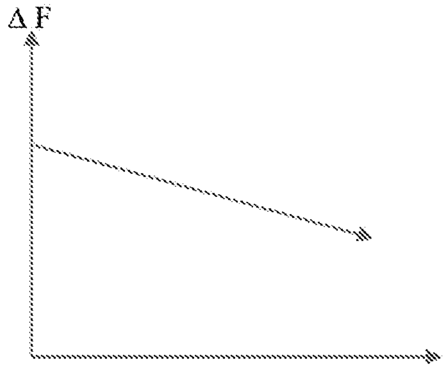
Figure 3B:
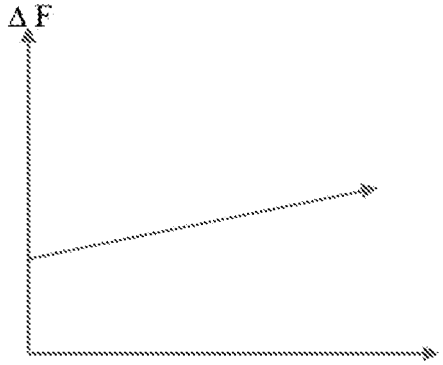
Figure 3C:
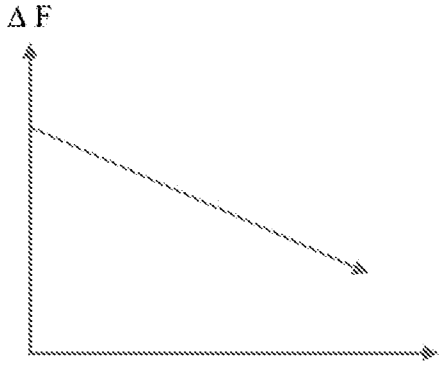
Figure 4A:
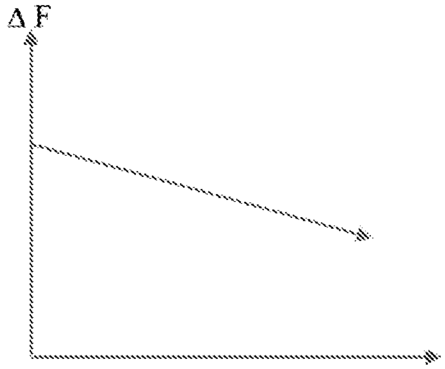
Figure 4B:
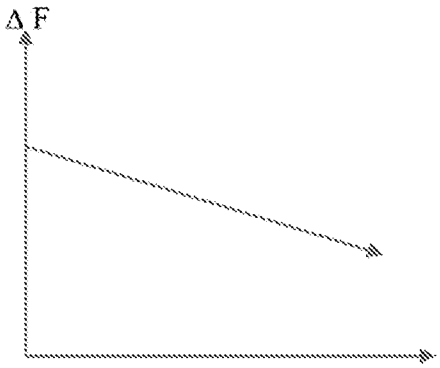
Figure 4C:
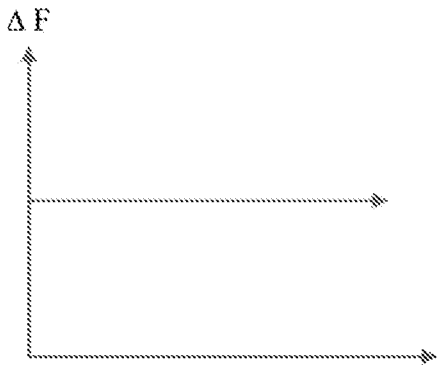

The invention as well as the technical environment will be exemplarily explained below based upon the figures. Shown schematically on:

FIG. 1: is a sectional view through a knife holder in a standby position,

FIG. 2: is a sectional view through the knife holder in a cutting position,

FIG. 3*a*: is the progression of the force exerted on the knife by a drive as a function of the adjustment path according to prior art, FIG. 3*b*: is the progression of the reset force exerted on the knife by the spring as a function of the adjustment path according to prior art, FIG. 3*c*: is the progression of the resulting force exerted on the knife as a function of the adjustment path according to prior art, FIG. 4*a*: is the progression of the force exerted on the knife by a drive as a function of the adjustment path according to the invention, FIG. 4*b*: is the progression of the reset force exerted on the knife by the spring as a function of the adjustment path according to the invention, FIG. 4*c*: is the progression of the resulting force exerted on the knife as a function of the adjustment path according to the invention.

The knife holder also comprises a positioning device 3, with which the circular knife 2 can be set in a drive direction 4 that is orthogonal to the drive direction of the lowering device, for example on a lower knife 13 (e.g., a counter knife 13).

The knife holder also comprises a positioning device 3, with which the circular knife 2 can be set in a drive direction 4 that is orthogonal to the drive direction of the lowering device, for example on a lower knife.

The positioning device 3 comprises a positioning piston apparatus 7. The positioning piston apparatus 7 comprises a multipart positioning piston head with a first positioning piston head part 9.1, a second positioning piston head part 9.2 and a screw 9.3, which connects the positioning piston head with an axis 10. The axis 10 is mounted by means of a bearing 11 so that it can be displaced along a straight line in the drive direction 4. The positioning piston apparatus 7 also comprises two membranes 8.1 and 8.2. The first membrane 8.1 is clamped between the first positioning piston head part 9.1 and the second positioning piston head part 9.2, while the second membrane 8.2 is clamped between the second positioning piston head part 9.2 and the axis 10.

It is also provided that compressed air can be introduced between the two membranes 8.1 and 8.2. Since the membranes 8.1 and 8.2 have different sized active surfaces, the positioning piston apparatus 7.1, and thus also the circular knife 2, is moved in the direction of the drive direction 4 by feeding in compressed air.

The force exerted on the knife by feeding in compressed air between the membranes 8.1 and 8.2 diminishes as the travel distance from the standby position shown on FIG. 1 increases.

In order to provide a reset force from the cutting position shown in FIG. 2 into the standby position shown in FIG. 1, a spring 5 designed as a helical spring is provided, the spring axis of which is inclined by an angle 6 relative to the drive direction 4.

While moving the positioning device 3 from the standby position into the cutting position, the spring 5 acts on the positioning piston apparatus 7 with a force opposite the drive direction 4. Since this force acts transversely to the longitudinal axis of the spring 5, the reset force diminishes with an increasing travel distance. As a result, the total force acting on a lower knife 13 (e.g., a counter knife 13) remains constant, regardless of the position along the adjustment path.

While pressing the circular knife 2 against a lower knife 13 (e.g., a counter knife), a torque is also introduced into the cutter head 1, which acts around an axis that is orthogonally aligned to the drawing plane. Because it is arranged inclined to the drive direction 4, the spring 5 can also counteract this torque, thereby diminishing the friction between the axis 10 and bearing 11.

FIGS. 3*a* to 3*c* denote the force exerted on the knife by a component (FIGS. 3*a* and 3*b*) and by the entire system (FIG. 3*c*) as a function of the adjustment path for prior art, while the corresponding force progressions on FIGS. 4*a* to 4*c* are denoted for the present invention.

FIGS. 3*a* and 4*a* show the force exerted on the knife 2 by the drive of the positioning device 3. As evident, this force diminishes with an increasing travel distance.

FIGS. 3*b* and 4*b* show the reset force exerted by a spring. According to prior art (FIG. 3*b*), for example as known from DE 102 60 031 B3, the reset force provided by the spring increases with an increasing travel distance, while according to the invention, the reset force acting against the drive direction 4 diminishes with an increasing travel distance. Therefore, the spring 5 according to the invention yields a negative force characteristic curve of the kind shown on FIG. 4*b*.

FIGS. 3*c* and 4*c* show the total force resulting from the positioning device and the spring. According to prior art (FIG. 3*c*), the resulting force diminishes with an increasing delivery path. As evident from FIG. 4*c*, a total force that remains constant over the adjustment path is provided according to the present invention owing to the negative characteristic curve of the spring 5.

REFERENCE LIST

1 Cutter head
2 Knife
3 Positioning device
4 Drive direction
5 Spring
6 Angle
7 Positioning piston apparatus
8.1 First membrane
8.2 Second membrane
9.1 First positioning piston head part
9.2 Second positioning piston head part
9.3 Screw
10 Axis
11 Bearing
12 Lowering device

What is claimed is:

1. A knife holder assembly for cutting machines, the knife holder assembly comprising:
a cutter head (1) for holding a knife (2); and
a positioning device (3), wherein the positioning device (3) comprises:
a piston apparatus (7) configured to drive the knife a drive direction (4) between a standby position and a cutting position, and
a spring (5), wherein the spring applies a reset force against the piston apparatus while the knife is in the cutting position,
wherein the spring (5) generates the reset force having a negative force characteristic curve in the drive direction (4), such that the reset force generated by the spring acting transversely to a longitudinal axis of the spring and against the piston apparatus (7) diminishes with an increasing travel distance in the drive direction (4) from the standby position to the cutting position and
wherein the longitudinal axis of the spring (5) is aligned at an angle (6) of 30° to 80° relative to the drive direction (4) when the knife is in the standby position.

2. The knife holder assembly according to claim 1, wherein the spring (5) is arranged and/or designed in such a way that the reset force having the negative force characteristic curve corresponds to the progression of a force characteristic curve generated by a drive of the positioning device (4) in the drive direction (4).

3. The knife holder assembly according to claim 1, wherein the reset force generated by the spring (5) also includes a force direction inclined to the drive direction (4).

4. The knife holder assembly according to claim 3, wherein the spring (5) counteracts a torque generated in the cutting position by pressing the knife (2) against a counter knife (13).

5. The knife holder assembly according to claim 1, wherein the spring (5) is a helical spring.

6. The knife holder assembly according to claim 1, wherein the piston apparatus (7) is pressurizable.

7. The knife holder assembly according to claim 6, wherein the spring (5) acts on the piston apparatus (7) on a side facing away from a pressurizable side.

8. The knife holder assembly according to claim 7, wherein the piston apparatus (7) comprises two membranes (8.1, 8.2), between which a pressurized fluid can be introduced.

9. The knife holder assembly according to claim 8, wherein the two membranes (8.1, 8.2) have different sized active surfaces.

10. The knife holder assembly according to claim 8, wherein the piston apparatus (7) has a multipart piston head (9.1, 9.2), and the membranes are fixed in place by the multipart piston head (9.1, 9.2).

11. The knife holder assembly according to claim 6, wherein the piston apparatus (7) has a piston rod designed as an axis (10), and the axis (10) is at least axially movably mounted by means of a bearing (11).

12. The knife holder assembly according to claim 1, wherein the knife holder assembly further comprises a lowering device (12) for the cutter head (1), wherein the lowering device is configured to move the cutter head (1) in a direction orthogonal to the drive direction (4).

* * * * *